United States Patent [19]

Garnjost et al.

[11] Patent Number: 5,456,341
[45] Date of Patent: Oct. 10, 1995

[54] METHOD AND APPARATUS FOR ACTIVELY ADJUSTING AND CONTROLLING A RESONANT MASS-SPRING SYSTEM

[75] Inventors: Kenneth D. Garnjost, Buffalo; Christopher A. Rauch, Holland; Gonzalo J. Rey, Batavia, all of N.Y.

[73] Assignee: Moog Inc., East Aurora, N.Y.

[21] Appl. No.: 52,474

[22] Filed: Apr. 23, 1993

[51] Int. Cl.$^6$ ............................................. F16F 15/04
[52] U.S. Cl. ........................... 188/378; 248/550; 267/136
[58] Field of Search ................................. 188/378, 379, 188/380, 382, 267; 248/550; 267/136, 140.14, 140.15; 280/707; 244/17.27, 17.11, 158 R; 416/500

[56] References Cited

U.S. PATENT DOCUMENTS

| | | | |
|---|---|---|---|
| 3,477,665 | 11/1969 | LeGrand | 244/17.25 |
| 3,836,098 | 9/1974 | Miyashita | 244/17.27 |
| 4,083,433 | 4/1978 | Geohegan, Jr. et al. | 188/382 |
| 4,365,770 | 12/1982 | Mard et al. | 244/17.11 |
| 4,483,425 | 11/1984 | Newman | 188/378 |
| 4,643,385 | 2/1987 | Sandercock | 248/550 |
| 4,742,998 | 5/1988 | Schubert | 267/136 |
| 4,757,980 | 7/1988 | Schubert | 267/136 |
| 4,869,474 | 9/1989 | Best et al. | 267/136 |
| 5,011,108 | 4/1991 | Chen et al. | 248/550 |

*Primary Examiner*—Douglas C. Butler
*Attorney, Agent, or Firm*—Phillips, Lytle, Hitchcock, Blaine & Huber

[57] ABSTRACT

An actively-controlled resonant-type force generator (20) is adapted to be attached to a structure (21), and includes a mass (23) mounted for movement relative to the structure and a plurality of springs (22, 24) operatively arranged between the mass and the structure. A servoactuator (26) is arranged to controllably excite the mass-spring system. The actual force ($F_a$) transmitted from the mass to the structure is compared with a commanded force ($F_c$) to produce a force error signal ($F_e$). The actuator is caused to produce a velocity as a function of the error signal. The gain of the closed force loop is selected so that the resonance of the mass-spring system has an effective damping ratio ($\zeta$) greater than about 0.5, and preferably about 0.7. Thus, the mass-spring system will not be substantially resonantly excited by vibrations of the structure near its resonant frequency ($\omega_n$).

22 Claims, 10 Drawing Sheets

(CLOSED LOOP)

(OPEN LOOP)

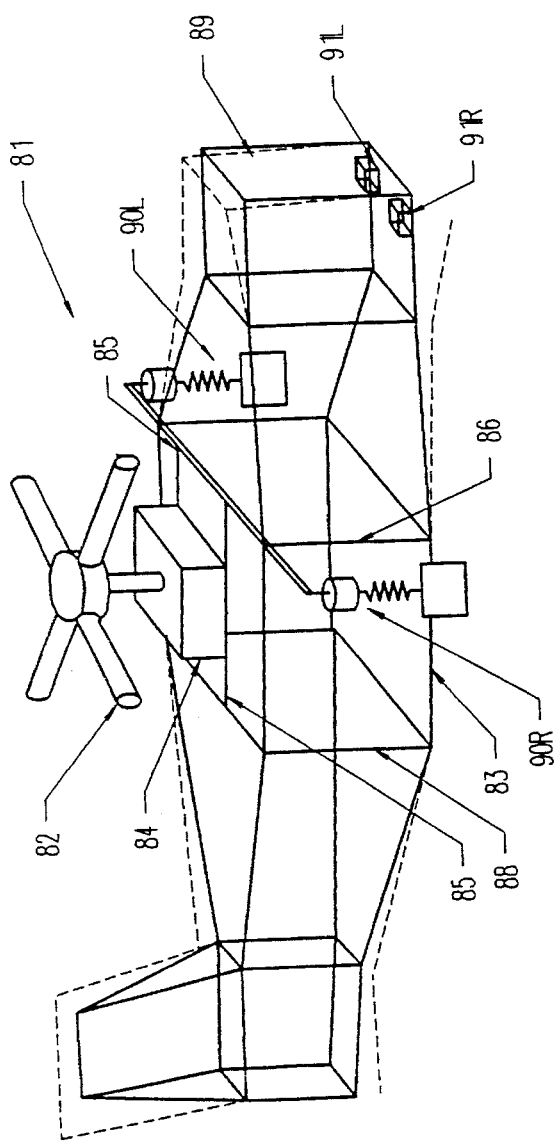
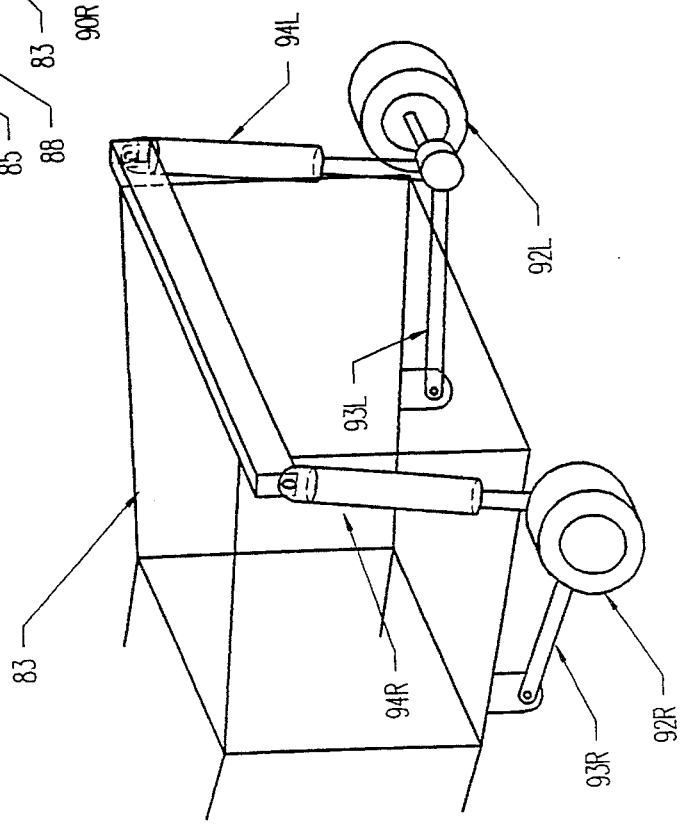

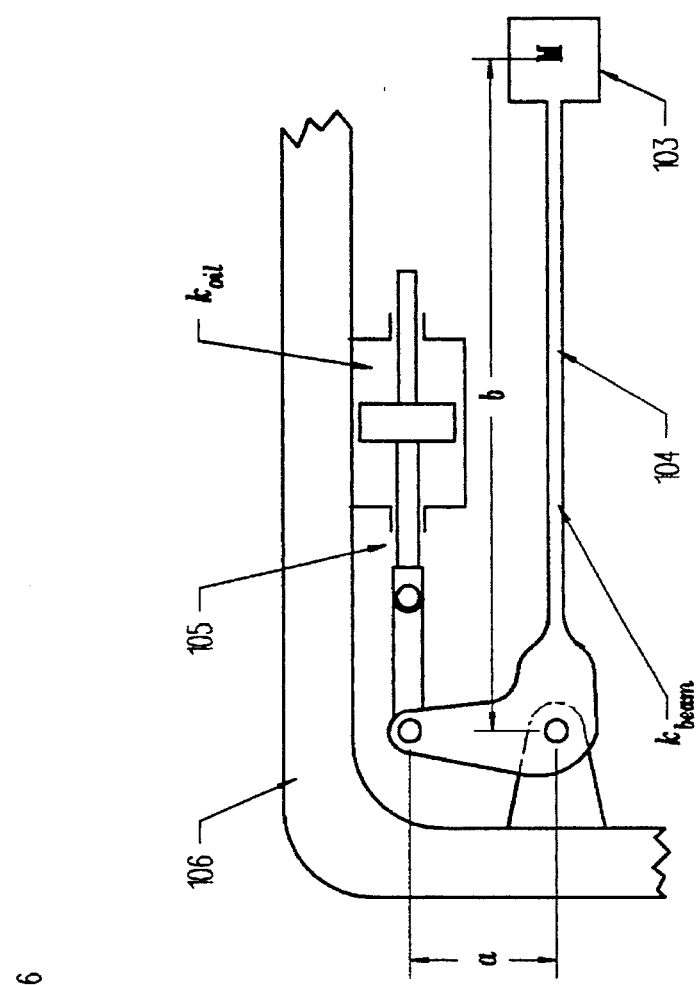
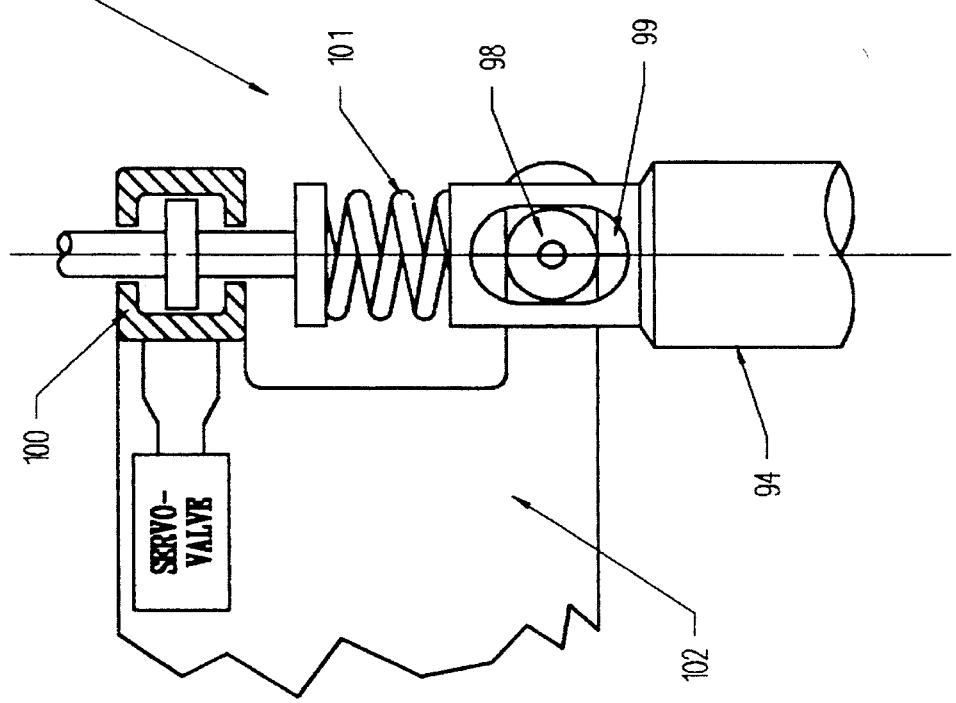
Fig. 16
Fig. 15

METHOD AND APPARATUS FOR ACTIVELY ADJUSTING AND CONTROLLING A RESONANT MASS-SPRING SYSTEM

TECHNICAL FIELD

This invention relates generally to the field of actively-controlled mass-spring systems, and, more particularly, to an improved method and apparatus for modulating the vibratory reaction force transmitted from the mass to a supporting structure. The mass-spring system may be operated either as an highly-damped inertial force generator in response to a command signal, or as a lightly-damped vibration absorber capable of having its resonant frequency track variations in the exciting frequency.

BACKGROUND ART

There are many sources of vibration in rotating machinery. For example, in flight, vibrations are transmitted to a helicopter fuselage from the rotor blades. While these may have many vibrational modes, it has been recognized that the dominant vibration is a function of the number of blades and their rotational speed. This is specifically mentioned in U.S. Pat. No. 3,477,665 ("LeGrand") at col. 1, line 35 et seq.:

"Due chiefly to the aerodynamic asymmetries occurring on the revolving rotor blades of rotary-wing aircraft, the rotors are subjected to alternating loads at frequencies which are multiples of the rotor speed and the number of blades. These loads are transmitted to the fuselage and cause it to vibrate at the same frequencies."

It is also discussed in U.S. Pat. No. 3,836,098 ("Miyashita") at col. 1, line 9 et seq.:

"In general, rotorcraft such as helicopters are subjected to large vibrations during flight as compared with fixed-wing aircraft, and this is attributable mainly to the forces and moment exciting forces from a rotor. Namely, with $\Omega$ representing the rate of rotation of the rotor and n representing the number of blades, there are generated an exciting force having a frequency of $n\Omega$ (hereinafter referred to as the $n\Omega$ vibration) and an exciting force have a frequency of an integer multiple of the rate of rotation (hereinafter referred to as $i\Omega$ vibration). The former is unavoidable with a rotor having n blades, . . ."

When transmitted to the fuselage, such vibrations are both annoying to the air crew and passengers, and contribute to their fatigue.

In an attempt to reduce, if not completely eliminate, such vibrations, it has been proposed to create an opposing vibrational waveform of like amplitude and frequency, but 180° out-of-phase with respect to the disturbance vibration. The thought here is that the created and disturbance vibrations, when superimposed, will oppose and substantially cancel one another. While this is theoretically possible, it must be remembered that the parameters of the rotor-produced vibrations are functions of many other factors, such as the load carried by the helicopter, the attitude of the helicopter due to maneuvering, its speed, etc. Hence, the rotor-produced vibration is subject to continuous change for various reasons, some controllable and others not.

Since the rotor-induced vibrations are usually centered at a substantially-constant frequency, and only deviate therefrom for short duration transients, a passive resonant-type vibration "absorber" is frequently utilized to generate opposing vibratory forces on the helicopter structure. Such an "absorber", often called a "tuned damper", is a single degree-of-freedom mass-spring system arranged to vibrate at its resonant frequency in response to the expected vibrations of the structure to which it is attached. When the structure causes the "absorber" to vibrate at its natural frequency, the reaction force exerted by the "absorber" on the structure will be out-of-phase with the vibratory displacement of the structure, but will be in-phase with the vibratory velocity of the structure. Hence, it will appear as "damping" or energy "absorption", and will have the effect of reducing the amplitude of the disturbance vibration at the mounting point. However, the amplitude of the opposing vibration will utilize the resonance phenomena only in the immediate vicinity of the natural frequency. This technique, and its limitations, are specifically referred to in U.S. Pat. No. 4,483,425 ("Newman") at col. 1, line 50 et seq.:

"Another related method of vibration control is passive vibration compensation, which uses inertial compensation through a resonant spring-countermass combination. This method is reasonably effective if the inertial force imbalance to be compensated is primarily sinusoidal at a single constant frequency. The spring-mass combination can be tuned to this frequency so that it responds to vibrations by oscillating to help cancel the vibrations. However, the effectiveness of this approach is limited because compensation only occurs at the single selected frequency, the amount of compensation depends upon the characteristics of the mechanical connection between the machine and its environment, and performance may seriously degrade with time or external influences." (Emphasis added.)

In an attempt to follow frequency variations in the disturbance vibration, some mass-spring "absorbers" have been designed to permit continuous adjustment of either the effective mass or the effective spring rate, with some criteria for recognizing the optimum "tuning". In one such device, as shown in U.S. Pat. No. 4,365,770 ("Mard" et al.), the preload on a cam-operated spring is adjusted by a hydraulic servo to "tune" the effective spring rate of a mass-spring "absorber" so that its natural frequency will substantially equal the frequency of the disturbance vibration. In this case, the spring preload position is calibrated to allow it to be set as a function of the measured vibration frequency. In another application of this technique, the radius of a pendulous mass is adjusted, by means of an electric motor and screw, to change the effective mass restrained by a fixed spring rate. Optimum "tuning" is sensed by comparing the relative phase relationship of an accelerometer measuring structural vibration to another accelerometer on the moving mass. Yet another "tuning" technique uses a motor-driven adjustable-ratio four-bar linkage to alter the relative motion of a vibrating mass. By affording the capability of varying either the effective mass or the effective spring rate, each of these arrangements overcomes the normal sharply-defined resonance of a "tuned" absorber having a fixed mass and a fixed spring rate, but does so at the expense of mechanical complexity.

DISCLOSURE OF THE INVENTION

With parenthetical reference to the corresponding structure of the first preferred embodiment (i.e., as shown in FIG. 1) for exemplary purposes only, and not by way of limitation, this invention provides, in one aspect, an active resonant inertial force generator (20) which is adapted to be attached to a structure (21), such as a helicopter fuselage.

The improved force generator broadly includes: a mass (23) mounted for movement relative to the structure; at least one spring (22, 24) operatively arranged between the mass and the structure; an actuator (26); the mass, the spring and the actuator being connected mechanically in series, with the spring and the actuator being arranged between the mass and the structure; command means (41) for generating an oscillatory force command signal ($F_c$); transducer means ($a_1$) arranged to generate a feedback signal proportional to the force transmitted from the mass to the structure; means (40) for producing an error signal ($F_e$) proportional to the difference between the command signal and the feedback signal; and control means (28) for causing the actuator to produce a velocity as a function of the error signal. In one preferred embodiment, the gain of the closed force loop is selected so that the resonance of the mass and the spring(s) has an effective damping ratio ($\zeta$) greater than about 0.5, and preferably about 0.7, such that the mass and spring(s) will not be substantially resonantly excited by vibrations of the structure at or near the resonant frequency of the mass-spring system.

In another aspect, as shown in FIG. 2, the invention provides an active resonant absorber (45) which is adapted to generate a reactive damping force in response to vibrations of a structure on which it is mounted. The improved absorber includes a mass (23) mounted for movement relative to the structure; at least one spring (22, 24) operatively arranged between the mass and the structure; an actuator (26); the mass, the spring and the actuator being connected mechanically in series, with the spring and the actuator being arranged between the mass and the structure; transducer means ($a_1$) arranged to generate a feedback signal proportional to the force transmitted from the mass to the structure; transfer function means (46) for modifying the force feedback signal which is provided to an amplifier; and actuator drive means (28). In the preferred embodiment of this form of the invention, the transfer function of the signal produced by the force transducer means is selected so that the oscillatory motion of the actuator will cause a modification of the mass-spring system effective natural frequency to match the structural vibration frequency, such that the amplitude of the excited system will be maximized.

In another aspect, the invention provides an improved method of operating an active resonant inertial force generator (i.e., as specifically defined infra), which method broadly comprises the steps of: commanding a desired vibratory force; oscillating the actuator to excite the mass-spring system to generate a net vibratory force; measuring the vibratory force generated by the excited mass; and controlling the actuator velocity as a function of the error between the commanded force and such generated force so as to cause the mass-spring system to generate a commanded vibratory force and to cause the mass-spring system to be damped with respect to external force disturbances; thereby to enhance the usable frequency response of the force generator to command signals.

In still another aspect, the invention provides a method of damping externally-induced vibrations at a point in a structure, which method broadly comprises the steps of: mounting an active resonant inertial force generator having a mass-spring system and an actuator on the structure so as to be capable of transmitting vibrations to the point; vibrating the structure to excite the mass-spring system to generate a vibratory force; measuring the vibratory force; and controlling the actuator as a function of the vibratory force so as to cause the effective resonant frequency of the mass-spring system to be modified to equal the structure vibration frequency, thereby to optimize the damping force reacted on the structure.

Accordingly, the general object of the invention is to provide an improved active resonant inertial force generator.

Another object is to provide an improved force generator which may be selectively operated to create a vibrational waveform to oppose and substantially reduce, if not eliminate, another vibrational waveform attributable to an external disturbance.

Another object is to provide an improved active resonant force generator which is capable of accommodating changes in the external disturbance frequency.

Another object is to provide an improved method of operating an active resonant force generator so as to create a vibrational waveform to oppose and substantially reduce, if not eliminate, another vibrational waveform attributable to an external disturbance.

Still another object is to provide an improved method of damping, or reducing, the externally-induced vibrations in a structure by means of an active resonant force generator.

These and other objects and advantages will become apparent from the foregoing and ongoing written specification, the drawings and the appended claims.

BRIEF DESCRIPTION OF THE DRAWINGS

FIG. 13 is a perspective schematic of a helicopter, showing inertial force generators as being mounted on the outboard ends of a transverse lifting beam.

FIG. 14 is a perspective schematic view of a portion of the helicopter shown in FIG. 13, and showing the landing gear as being used as the mass.

FIG. 15 is a schematic vertical view, partly in section and partly in elevation, showing the servoactuator connected to the upper end of the oleo strut through a spring and a spring-biased lost-motion connection.

FIG. 16 is a schematic view of an alternative arrangement, showing the mass as being mounted on the distal end of an intermediately-pivoted flexible lever.

DESCRIPTION OF THE PREFERRED EMBODIMENTS

Figure 1:
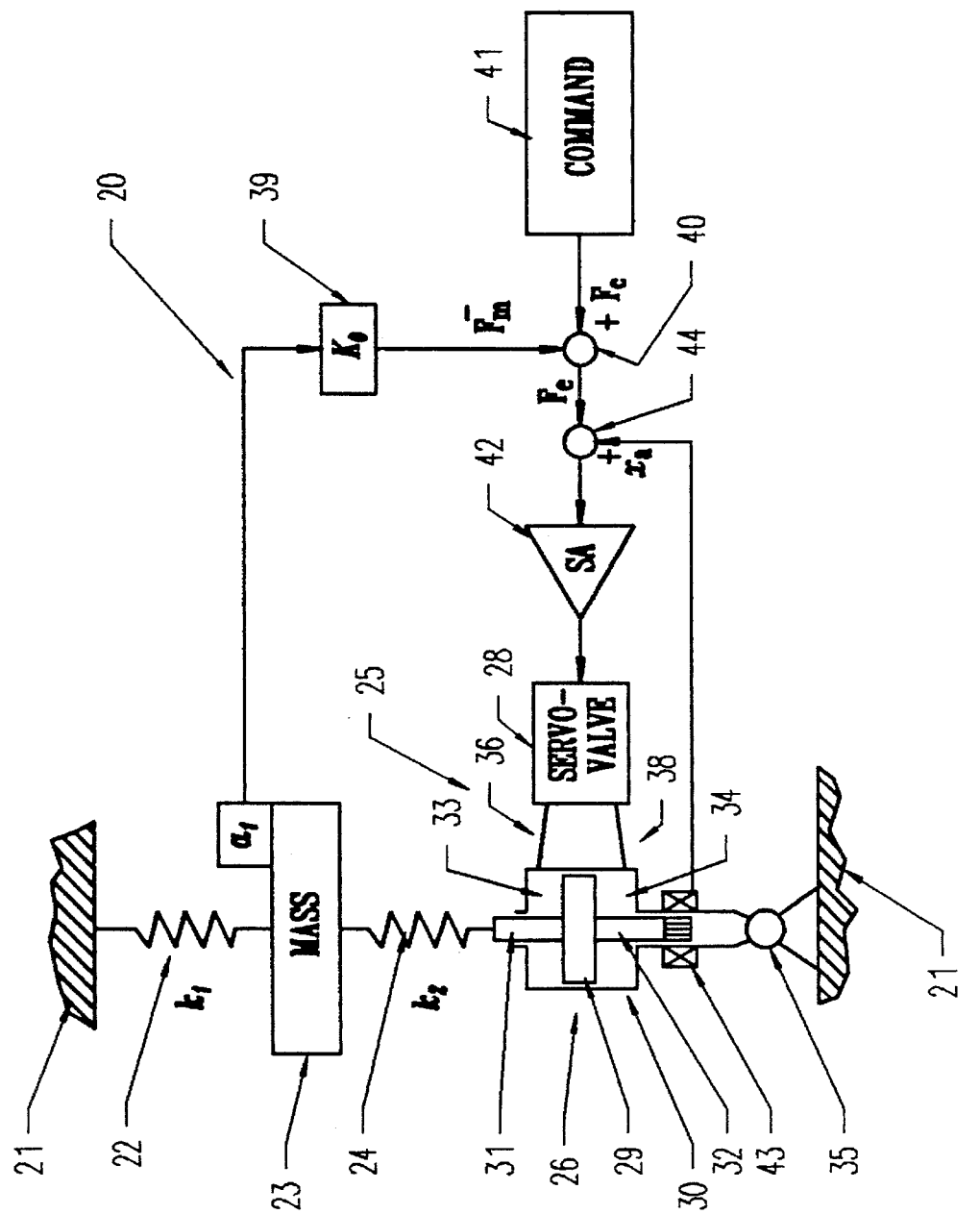
FIG. 1 is a hybrid schematic-block diagram of a first form of actively-controlled mass-spring system functioning as an inertial force generator, this view showing the mass, the springs, the servoactuator, the outer force feedback loop, and the inner actuator rod position loop.

At the outset, it should be clearly understood that like reference numerals are intended to identify the same structural elements, portions or surfaces consistently throughout the several drawing figures, as such elements, portions or surfaces may be further described or explained by the entire written specification of which this detailed description is an integral part. Unless otherwise indicated, the drawings are intended to be read (e.g., arrangement of parts, mounting, etc.) together with the specification, and are to be considered a portion of the entire written description of this invention. As used in the following description, the terms "horizontal", "vertical", "left", "right", "up" and "down", as well as adjectival and adverbial derivatives thereof (e.g., "horizontally", "rightwardly", "upwardly", etc.) simply refer to the orientation of the illustrated structure as the particular drawing figure faces the reader. Unless otherwise indicated, the terms "inwardly" and "outwardly" refer to the orientation of a surface relative to its axis of elongation, or axis or rotation, as appropriate.

The present invention provides an effective technique for actively and continuously adjusting the resonant frequency of a mass-spring system. This technique may be applied to a resonant-type "absorber" which reacts to vibrations of the structure on which it is mounted, or to a resonant-type inertial force generator which produces forces on the mounting structure in response to a command signal.

The improved method contemplates the provision of a controllable actuating element (e.g., a fluid-powered actuator, an electromagnetic actuator, etc.) in combination with a mass and spring, and the closing of a control servoloop from the mass vibration to such element. The addition of such an actuating element to a mass-spring system is believed to be individually "old", and appears to have been described in Miyashita and Newman, supra. However, it is believed that the adaptation of closed-loop control techniques, as disclosed herein, to such controllable mass-spring systems, is novel and unique. This control method may be implemented in several basic forms, each of which modulates the actuating element at the vibration frequency so as to instantaneously modify the effective mass or the effective spring rate.

To effectively provide a resonant-type "absorber" or force generator, the modulation of the various actuating devices described above can be controlled by closing an appropriate servo-control loop from a sensor measuring a parameter of the vibratory mass motion (i.e., its displacement, velocity or acceleration), suitably processing the sensor-supplied signal, and supplying a control input derived from this signal to the actuator. As an example, consider the implementation of a resonant inertial force generator intended to produce a variable-frequency variable-amplitude vibratory force in response to a command signal. If the command signal is algebraically summed with a negative feedback mass acceleration signal (i.e., indicative of the generated inertial reaction force) to produce a servo-loop error signal which causes a proportional actuator velocity, the gain of that servo-loop may be adjusted so that the mass-spring system will appear to be highly damped. As a result, the system will not be excited by vibratory motion of the supporting structure, but will cause the mass to oscillate and produce a force at the amplitude, phase and frequency of the command signal. This can occur because the modulation of the actuator can be thought of as "re-tuning" the resonant frequency of the mass-spring system to correspond to the command frequency, and because the modulation can also inject a vibratory excitation to overcome any energy losses and to cause a resonant oscillation at the required amplitude.

On the other hand, a self-tuning (i.e., frequency-tracking) actively-controlled resonant-type "absorber" can be implemented which will be excited by vibratory motion of the mounting structure, and which will cause the mass-spring system to resonate at the exciting frequency and produce a structural reaction force proportional to the velocity of the support structure vibration. Again, depending on the gain of the feedback loop, the actuator modulation can add energy to the system so that it will appear to be very lightly damped, but not actively unstable. The feedback loop to achieve this performance can be implemented in various ways, including adaptive gain and phase adjustment, to maximize the reaction force for a given structural excitation. The simplest, and thus most preferred, method would be to filter the mass acceleration signal (or its equivalent) through a linear analog transfer function so that the actuator is modulated with the desired gain and phase at any frequency within a design operating bandwidth.

The mechanical spring stiffness should be modified as the square of the frequency change from the basic mechanical natural frequency. Since the mass acceleration at any given amplitude is a function of the square of the frequency, the acceleration signal can be used directly to modulate the actuator. It is only necessary to provide a reference so that the actuator motion is zero at the basic resonance, and increases in amplitude out-of-phase with the mass for increasing frequency, and in-phase with the mass for decreasing frequency.

The invention broadly provides an improved actively-controlled resonant-type force generator which is adapted to be attached to, or otherwise mounted on, a structure, and which is adapted to be operated in such a manner as to selectively create vibrational forces to oppose and reduce, if not substantially cancel, other vibratory forces transmitted to the structure which are attributable to external disturbances. The invention is deemed to have particular utility in reducing the net vibrations within the fuselage of a helicopter. However, while the preferred embodiments will now be described in such a helicopter environment, it should be clearly understood that the invention possesses general utility and is not limited to this particular end use. For example, the invention might be used to oppose external-disturbance vibrations transmitted to other vehicles (e.g. automobiles, trucks, aircraft, ships, etc.), and still other movable and static structures. Hence, as used herein, the word "structure" is intended in a broad all-encompassing generic sense.

Indeed, in some aspects, the invention is not limited to use in opposing such vibrations due to external disturbances, and should be regarded as generally providing a means for transmitting a controllable oscillatory force to a structure, regardless of whether other vibrations are transmitted to that structure and regardless of the purpose to which such oscillatory force is put. As used herein, the term "active resonant force generator" specifically refers to a means or mechanism for generating forces which: (1) is controlled actively (i.e., as opposed to a passive or purely reactive device), (2) which utilizes the principles of resonance in at least a portion of its operating bandwidth, and (3) which transmits force or an analog thereof (i.e., the acceleration of a mass, a fluid pressure acting on an area, etc.) to a supporting structure. This generally contemplates that a controllable actuator be associated with a mass-spring system such that the actuator may be selectively and controllably oscillated to excite and control the vibrations of the mass-spring system.

To appreciate the inventive concept, consider the mass-spring-actuator arrangement shown in FIG. 1.

FIG. 1 (Actively-Controlled Force Generator)

Referring now to FIG. 1, a first form of the improved actively-controlled mass-spring system, generally indicated at 20, is schematically illustrated as being operatively mounted on a structure, two separate portions of which are severally indicated at 21, such as the fuselage of a helicopter. This form of mass-spring system is configured as a force generator, and includes an upper first spring 22 having a spring rate $k_1$, an intermediate mass 23, a lower second spring 24 having a spring rate $k_2$, and a lowermost servo-actuator, generally indicated at 25.

In this embodiment, springs 22 and 24 are both coil springs, and are restrained against lateral movement by suitable means (not shown). Thus, the mass-spring system has one degree of freedom with the mass experiencing only vertical movement through complaint deflection of springs 22 and 24. The upper end of first spring 22 is fixed to the structure, and its lower end is fixed to the mass.

Servoactuator 25 is shown as including a double-acting fluid-powered actuator 26 and a four-way flow-control electrohydraulic servovalve 28. Actuator 26 has a piston 29 mounted for sliding movement within a vertically-elongated cylinder 30. A rod 31 extends axially upwardly from the piston and sealingly penetrates the upper end wall of the cylinder. Another rod 32 extends axially downwardly from the piston and sealingly penetrates the lower end wall of the cylinder. The upper end of spring 24 is suitably fixed to the mass, and its lower end is fixed to upper rod 31. Rods 31, 32 are of the same diameter. Hence, the piston has equal-area annular surfaces facing into the upper and lower chambers 33, 34, respectively, of the actuator. The lower end of the cylinder is fixed to the structure via a clevis-type connection 35.

Servovalve 28 communicates with a source (not shown) of pressurized fluid at a supply pressure, and with a fluid sump or return (not shown) at a return pressure. The servovalve is operatively arranged to control the flows of fluid via conduits 36, 38 with respect to actuator upper and lower chambers 33, 34, respectively. This servovalve may possibly be of the two-stage four-way type, such as shown and described in U.S. Pat. No. 3,023,782, the aggregate disclosure of which is hereby incorporated by reference. The connections of the servovalve to supply and return have simply been omitted in the interest of clarity.

An accelerometer $a_1$, mounted on mass 23, is arranged to sense the vertical spatial acceleration of the mass, and provides an electrical signal proportional to such sensed acceleration of the mass which, when multiplied by a gain of $K_0$ in block 39, produces a signal $F_m$ representing the force acting on the mass. This signal is supplied as a negative input to summing point 40.

A command signal source 41 is arranged to supply an oscillatory force command signal $F_c$ as a positive input to summing point 40. The algebraic sum of signals $F_c$ and $F_m$ is reflective of the net vibratory force transmitted from the mass to the structure. Accelerometer $a_1$ constitutes transducer means operatively arranged to generate a feedback signal proportional to the force transmitted from the mass to the structure. This feedback signal is algebraically summed with the force command signal in summing point 40 to provide a force error signal $F_e$ which is supplied through servoamplifier 42 to the servovalve. The closed force servoloop thus formed drives the force error signal $F_e$ toward zero such that the actual force exerted by the mass on the structure equals the commanded force. However, since the force command signal ($F_c$) is oscillatory, the flows of fluid between the servovalve and actuator chambers 33, 34 will also be oscillatory, and the position of the actuator piston with respect to the cylinder will vary as a function of time.

An LVDT 43 is operatively arranged to supply a negative feedback signal reflective of the actual position ($x_a$) of the piston relative to the cylinder, to a summing point 44 positioned between summing point 40 and amplifier 42. The function of this is to provide a closed low-gain inner position servoloop within the outer force loop such that the actuator piston will oscillate about the mid-point of its stroke.

The total gain of the outer force loop (i.e., the product of the individual gains of all elements in that loop) is selected such that the mass-spring system (i.e., mass 23 and springs 22, 24) will be synthetically damped to the extent desired. Persons skilled in this art will recognize that the amount of such damping may be expressed in terms of a dimensionless damping ratio ($\zeta$), this being the ratio of the particular damping coefficient (c) to the critical damping coefficient ($c_r$). Thus, $\zeta = c/c_r$, where the critical damping coefficient ($c_r$) represents the minimum damping for which the system will return to rest without oscillation. It is presently felt that this damping ratio should be at least 0.5, and, preferably, about 0.7, so that the mass-spring system will not be resonantly excited by externally-induced vibrations of the structure near the natural frequency $\omega_n$ of the mass-spring system, and will only respond to the electrical command.

Real physical damping of a moving mass is typically provided by a mechanism which dissipates energy to generate a reactive force proportional to its velocity or rate of change of displacement. Causing a hydraulic actuator to "wind up" a coupling spring to produce an incremental force acting on the inertia proportional to the integral of its acceleration, is mathematically the same as saying the incremental force is proportional to the velocity of the mass. This force thus has the same effect as real physical damping. By adjusting the forward gain of the force feedback loop (i.e., the actuator velocity for a given force error), any desired damping ratio may be achieved. If the mass-spring system is desirably damped (i.e., ($\zeta$=0.7), it will be essentially unresponsive to vibration of the structure at or near the natural frequency of the mass-spring system. This should be contrasted with a passive absorber which takes advantage of the highly resonant response of a lightly-damped mass-spring system to produce very large vibratory forces in response to small structural vibrations at the resonant frequency.

The active synthetically-damped mass-spring system of the present invention will respond to the command input to cause the mass to vibrate at an amplitude necessary to produce the commanded force over a relatively-wide frequency band (i.e., greater than ±10% of $\omega_n$). However, the actuator motion needed to produce a given mass motion will be very small at the natural frequency of the mass-spring system, and will thus require very little hydraulic power at that particular frequency. As the frequency varies from the natural frequency, the amplitude of actuator movement required to maintain the mass-spring system excited at a desired amplitude will increase with the amount of frequency offset from the natural frequency.

Figure 2:
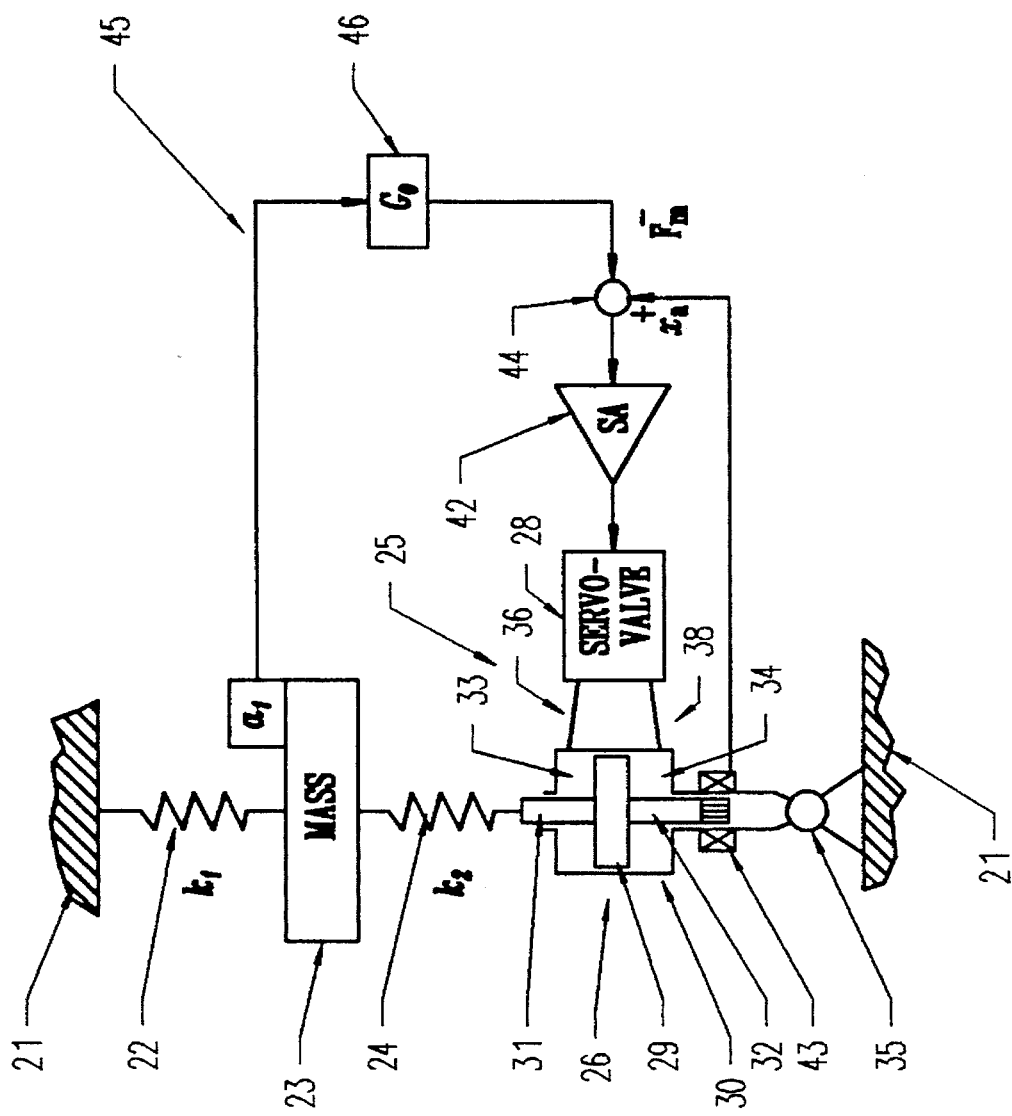
FIG. 2 is a hybrid schematic-block diagram of a second form of actively-controlled mass-spring system shown in FIG. 1, this system functioning as a vibration absorber.

FIG. 2 (Actively-Controlled Vibration Absorber)

The force generator shown in FIG. 1 may be readily modified to provide an actively-controlled resonant-type "absorber", indicated at 45 in FIG. 2, which will "self-tune", or track variations in the disturbance frequency, to maintain the mass-spring system in resonance. The acceleration feedback which produced actuator velocity to synthesize mass damping, and the force command input, have been eliminated. In their place, acceleration feedback causes proportional actuator displacement. The sensed acceleration of the mass is also double integrated by gain $G_0$ in box 46, as shown in box 46, to generate an apparent mass displacement term and to provide a zero actuator command reference at the natural frequency, independent of amplitude. Indeed, gain $G_0$ is:

$$G_0 = \left[ K_1 - \frac{K_2}{s^2} \right]$$

where $G_0$ is the gain, $K_1$ and $K_2$ are constants, and s is the LaPlace operator.

If it be assumed that the structure is vibrated at the basic mechanical natural frequency, the mass-spring system will be excited and the mass will vibrate at a relatively large amplitude to generate a damping reaction force on the structure. The ratio of gains $K_1$ and $K_2$ are adjusted so that the summed actuator command signal is zero at that frequency, $\omega_n$. If the structural excitation frequency is increased by, say, 10%, the effective spring stiffness should be increased by the square of the frequency, or 21% (i.e., $1.10^2$=1.21), to maintain resonant tuning. For constant mass vibration amplitude, the mass acceleration will increase by the square of the frequency. Thus, gains $K_1$ and $K_2$ can be selected so that the net actuator modulation command will cause the required apparent spring stiffness increase. A similar effect will occur for a frequency decrease, whereby an actuator modulation command will be generated with inverse phase to produce a desired apparent spring stiffness decrease.

Advantages Of The Invention

As previously noted in the foregoing Background Art section, it has been recognized in the prior art that a servoactuator may be used to excite a mass-spring system to produce vibratory forces. For example, Miyashita, supra, appears to disclose a mass-spring system which is adapted to be excited at its natural frequency by means of a servovalve-controlled hydraulic actuator. This reference teaches that an array of vibration "absorbers" may be commanded by a controller operating on signals derived from accelerometers mounted on a vibrating structure. However, he fails to recognize the practical need for closed-loop feedback control of the actual force developed by the vibrating mass-spring system.

An actuator-excited mass-spring system with a feedback transducer associated with the moving mass is disclosed in Newman, supra. This reference describes the measured parameter as either displacement, velocity or acceleration. However, this feedback is used only to cause the vibration of the "counter-mass" to be matched to the measured vibration of another vibrating mass (such as an engine) mounted on the same machine housing. While this constitutes closed-loop control of a sort, it is not equivalent to that disclosed in the present invention. Newman does appear to recognize the possibility of instability in a feedback control loop, since he mentions the inclusion of a "lead compensator", which is a commonly-used device to enhance stability in certain types of servocontrol. Although he suggests, in passing, that a spring may be added to the moving mass and tuned to a predominant frequency to reduce the actuator power consumption, he clearly does not take this into account in any consideration of control stability.

While the foregoing references have sought to apply active control techniques to vibration attenuators, the prior art has, upon information and belief, failed to appreciate the stability problems attendant the use of closed-loop control methods with lightly-damped resonating mass-spring systems.

To the best of the inventors' knowledge and belief, there is no directly relevant prior art, other than that just cited, with respect to the "active absorber" form of the invention, as shown in FIG. 2. This system feeds back the moving mass acceleration, without comparison to a command signal, through a dynamic filter to drive the actuator to effectively "re-tune" the resonant frequency of the mass-spring system to match that of the structural vibration exciting the absorber.

Figure 3:
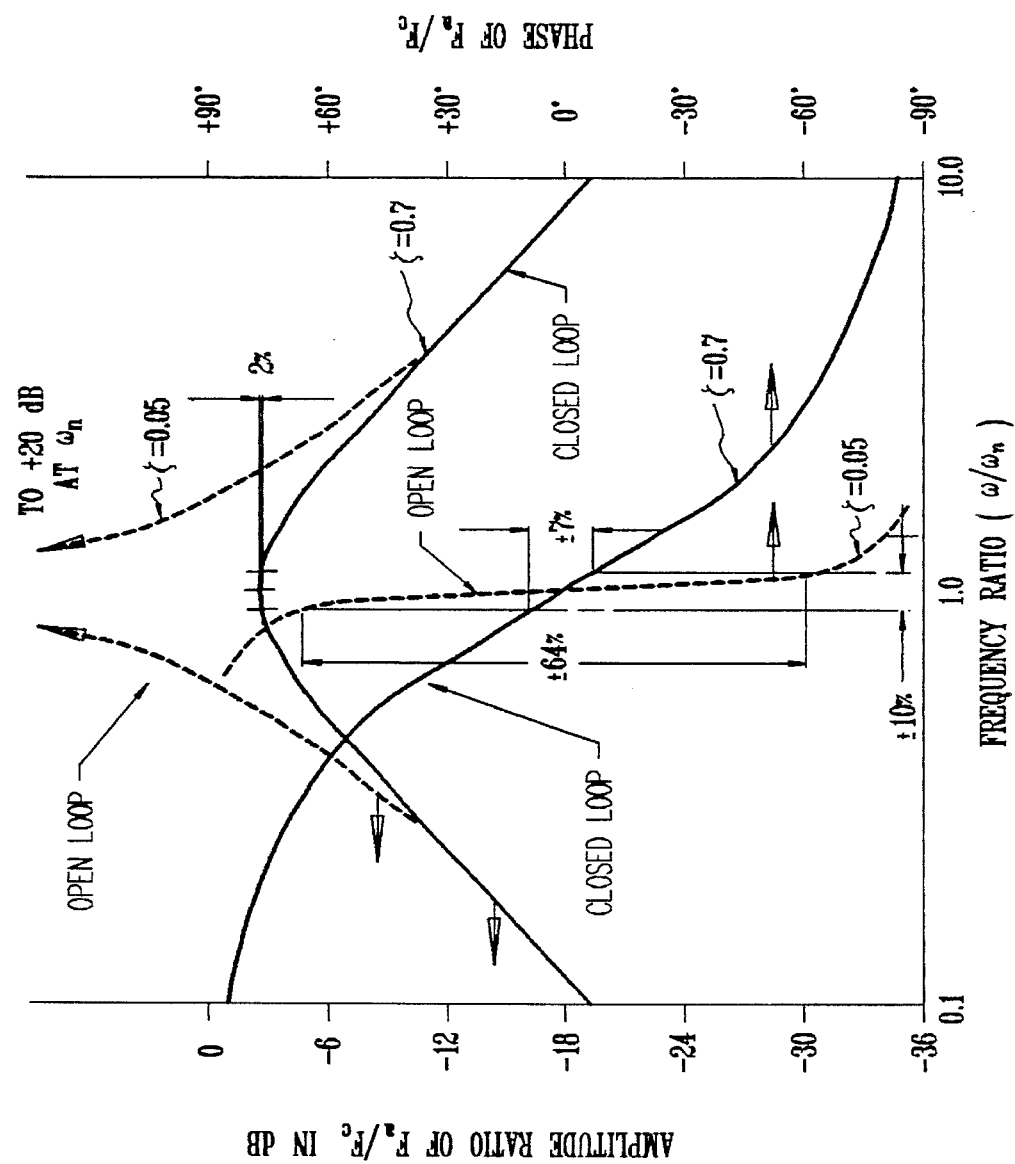
FIG. 3 is a plot of force amplitude ratio (left ordinate) and phase angle (right ordinate) as a function of frequency ratio (abscissa), and compares the performance of the improved closed-loop synthetically-damped mass-spring system with a prior art open-loop lightly-damped system.

The advantages of the improved closed-loop synthetically-damped system, as compared to the prior art open-loop lightly-damped systems, are dramatically illustrated in FIG. 3. FIG. 3 is a plot of the amplitude ratio, $F_a/F_c$ (left ordinate), expressed in decibels (db), of the actual force ($F_a$) to the commanded force ($F_c$), and the phase angle ($\phi_{Fa/Fc}$) between the actual and commanded forces (right ordinate) vs. the frequency ratio ($\omega/\omega_n$) (abscissa).

The force amplitude ratio of the lightly-damped (i.e., ($\zeta$=0.05) open-loop system, represented by the dashed lines in FIG. 3, is shown as rising quickly to an off-scale peak of +20 db at a frequency ratio of 1.0, and as falling off sharply as the frequency varies from this value. Thus, the force amplitude ratio reaches its peak-like maximum value at $\omega_n$, and falls off as the frequency varies from the natural frequency. At the same time, a difference of ±10% of the frequency ratio will cause a corresponding variation in the phase angle of about ±64°.

However, with the improved closed-loop synthetically-damped system (i.e., ($\zeta$=0.7), represented by the solid lines in FIG. 14, the dome-shaped curve of force amplitude ratio only changes by about 2% for a ±10% change in frequency, while the phase angle of the synthetically-damped closed-loop system will vary by only about ±7%. Thus, the synthetically-damped resonant force generator can be effectively utilized in an adaptive vibration reduction control system.

Another way of appreciating the potential active control stability problem is to compare the time response of an oscillating mass-spring system, with and without synthetic damping, as the commanded amplitude is changed. This is graphically illustrated in FIGS. 4 and 5, in which the vibrational amplitudes of the actuator command ($F_c$) and the mass ($x_m$) are both plotted against time (t). In these illustrations, it is assumed that the actuator is initially oscillated at a constant amplitude between times $t_0$ and $t_1$, and that the mass oscillates at a constant amplitude during this time interval.

Figure 4:
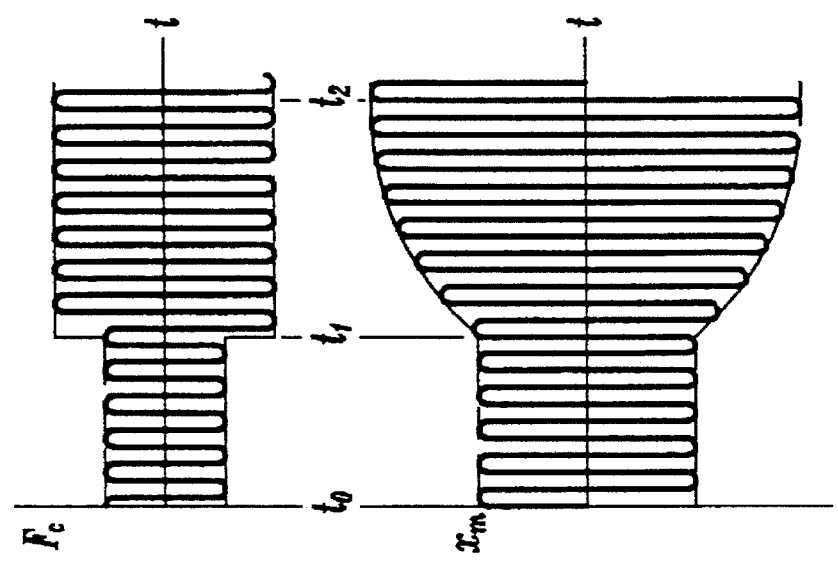
FIG. 4 is a graph showing the amplitudes (ordinate) of the commanded force and mass vibration of an open-loop, lightly-damped mass-spring system, as a function of time (abscissa).

Assume now that at time $t_1$, there is a step change in the actuator command signal ($F_c$). Such change could, for example, be attributable to some change in the external vibration. If the actuator command signal experiences such an increase, the actuator displacement will experience a step increase at time $t_1$. If the mass-spring system is lightly damped, however, such a change in the exciting force supplied by the actuator will not produce an immediate step-like increase in the mass displacement, as shown in FIG. 4. Rather, the displacement of the mass will asymptotically approach a responsive increased value at some later time $t_2$. Thus, there is a time delay (i.e., between times $t_1$ and $t_2$) between a change in the exciting force and the responsive change in the oscillating amplitude of the mass. In the real world, this delay may be several seconds and many decades of cycles. For example, if the frequency of the external disturbance is, say 20 Hz, then an interval between times $t_1$ and $t_2$ of, say 5 seconds, will represent 100 cycles. The practical effect of this is that the response of the mass-spring system will lag far behind a change in the desired force. Hence, vibration reduction or attenuation in an open-loop control system lacks dynamic responsiveness, and such a control system may well be unstable.

Figure 5:
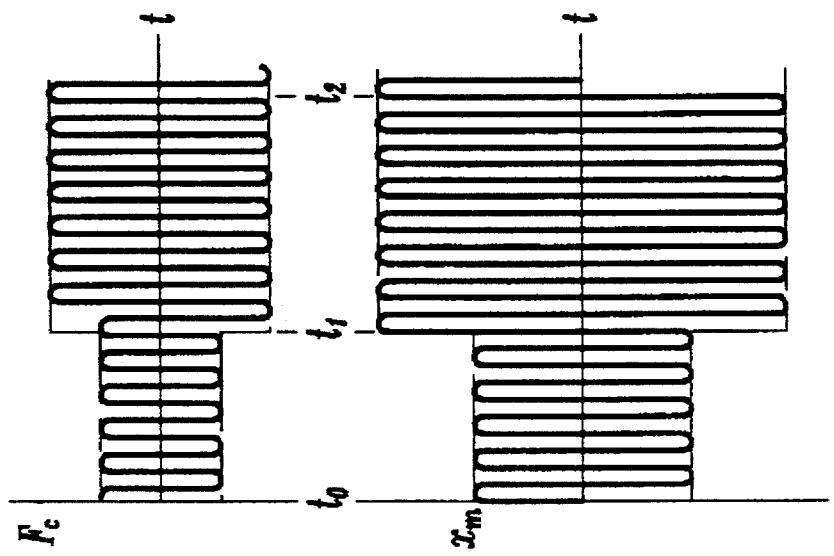
FIG. 5 is a graph showing the amplitudes (ordinate) of the commanded force and mass vibration of the improved closed-loop, synthetically-damped mass-spring system, as a function of time (abscissa).

The present invention overcomes this problem by providing a closed force loop about the mass-spring system and the actuator so that its resonance will have an effective damping ratio of greater than about 0.5, and preferably about 0.7, as shown in FIG. 5. The physical characteristics of the mass and spring are unchanged. Hence, the mass-spring system may be designed (i.e., "tuned") to have its natural frequency equal the expected frequency of the external disturbance. The mass-spring system is synthetically damped in the closed force loop so that it closely follows a change in the forcing function.

FIG. 5 is a plot similar to FIG. 4, showing the improved dynamic response of the mass amplitude ($x_m$) to a step increase in the forcing function ($F_c$). In this illustration, the actuator amplitude is shown as experiencing a step increase at time $t_1$, as in FIG. 4. However, because of the effective damping provided by the gain of the closed force loop, the amplitude of the responsive mass closely follows the change in the exciting force. In other words, the mass quickly adjusts to a new amplitude within one cycle of the change in the forcing function, as opposed to a several decades-of-cycles delay in the lightly-damped open-loop system shown in FIG. 4.

Modifications

The present invention has been disclosed in two principal forms (i.e., either as an actively-controlled force generator, or as an actively-controlled vibration "absorber"), both of which employ a servo-controlled hydraulically-powered actuator as the mass-spring system actuating element. Other actuating elements may be substituted therefor, but the mechanical impedance characteristics of the actuator will have an effect on the system performance and configuration required. To make these effects clear, the invention will be described in alternative embodiments and with actuating elements having different impedances. First, an alternative representation of the system shown in FIG. 1 will be presented for reference, and then various modifications therefrom will be described.

Figure 6:
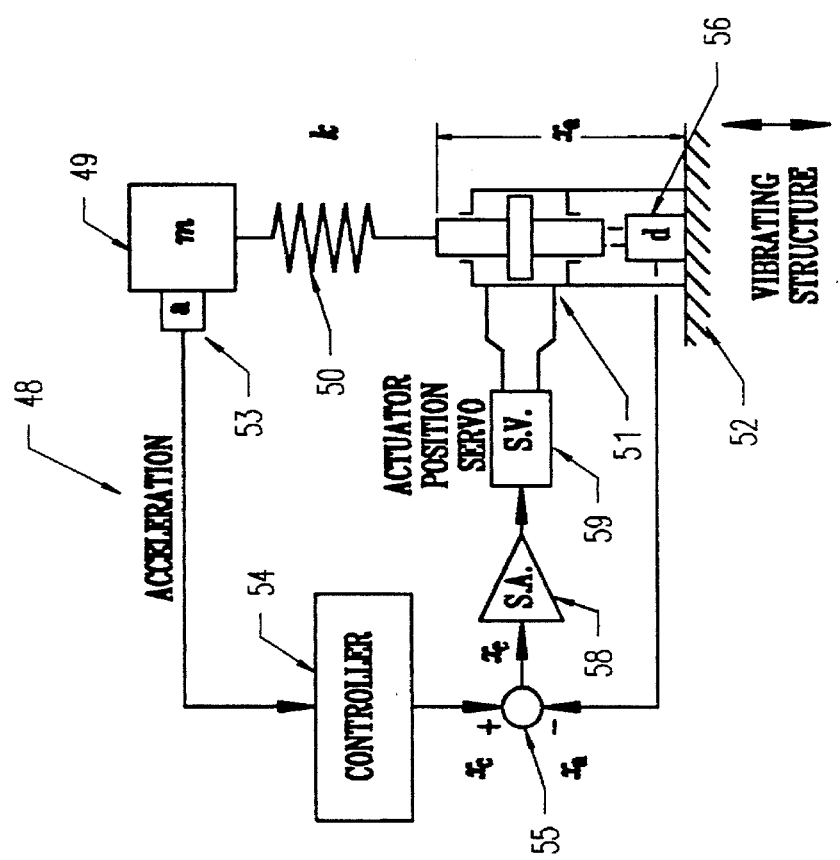
FIG. 6 is a hybrid schematic-block diagram of a variant form of actively-controlled mass-spring system having a high-impedance actuator and operatively arranged to vary the effective spring rate of the mass-spring system.

FIG. 6 (High-Impedance Actuator With Variable Effective Spring Rate)

FIG. 6 is a hybrid schematic-block diagram of an elementary actively controllable mass-spring system, generally indicated at 48, having a mass 49, a spring 50 and a double-acting fluid-powered actuator (i.e., a piston-and-cylinder) 51 connected mechanically in series with a vibrating structure 52. The direction of vibration of the structure is indicated by the bi-directional arrows. Mass 49 has a mass m, and spring 50 has a spring rate k. The spatial vertical acceleration of the mass is sensed by an accelerometer 53, which supplies an output signal to controller 54. The controller contains the appropriate algorithm(s), and converts the received acceleration signal into an actuator rod position command signal $x_c$, which is supplied to a summing point 55. The actual position ($x_a$) of the actuator rod relative to structure is sensed by an LVDT 56, and is supplied as a negative feedback signal to summing point 55. The command and feedback signals are algebraically summed in summing point 55, which provides an output actuator rod position error signal ($x_e$) to servoamplifier 58, which in turn supplies an appropriate current ($i_v$) to servovalve 59 for controlling the flows of fluid with respect to the upper and lower actuator chambers, and hence the position of the actuator rod relative to its cylinder and vibrating structure 52. Servovalve 59 may also possibly be of the two-stage four-way type, such as shown and described in the aforesaid U.S. Pat. No. 3,023,782.

If actuator 51 is held fixed and immovable (i.e., $x_e=0$), then disturbance vibrations will be transmitted from structure 52 through the actuator to the mass-spring system. The mass-spring system will have a natural frequency ($\omega_n$) related to the values of m and k according to the familiar equation:

$$\omega_n = \frac{1}{2\pi} \sqrt{\frac{k}{m}}$$

However, actuator 51 may be selectively operated (i.e., extended or retracted, as appropriate) to selectively vary the apparent spring stiffness (k), and hence the natural frequency of the mass-spring system. For example, as the mass moves downwardly toward the structure so as to normally compress the spring, the actuator rod may be commanded to retract in-phase therewith, thereby reducing the amount of actual spring deflection for a given displacement of the mass toward the structure. Similarly, as the mass moves upwardly away from the structure so as to normally extend the spring, the actuator rod may be commanded to extend in-phase therewith so as to reduce the amount of spring displacement for a given displacement of the mass away from the structure. In either case, the effective spring stiffness will appear to be reduced, with an accompanying reduction in the natural frequency of the mass-spring system.

Conversely, if the actuator motion is out-of-phase with the mass motion (i.e., so as to further compress, or further extend, the spring, as appropriate), the spring stiffness will appear to be increased, with an attendant increase in the natural frequency of the system. Thus, the controller may be selectively operated so as to controllably vary the effective spring stiffness, and, hence, the natural frequency of the system.

Figure 7:
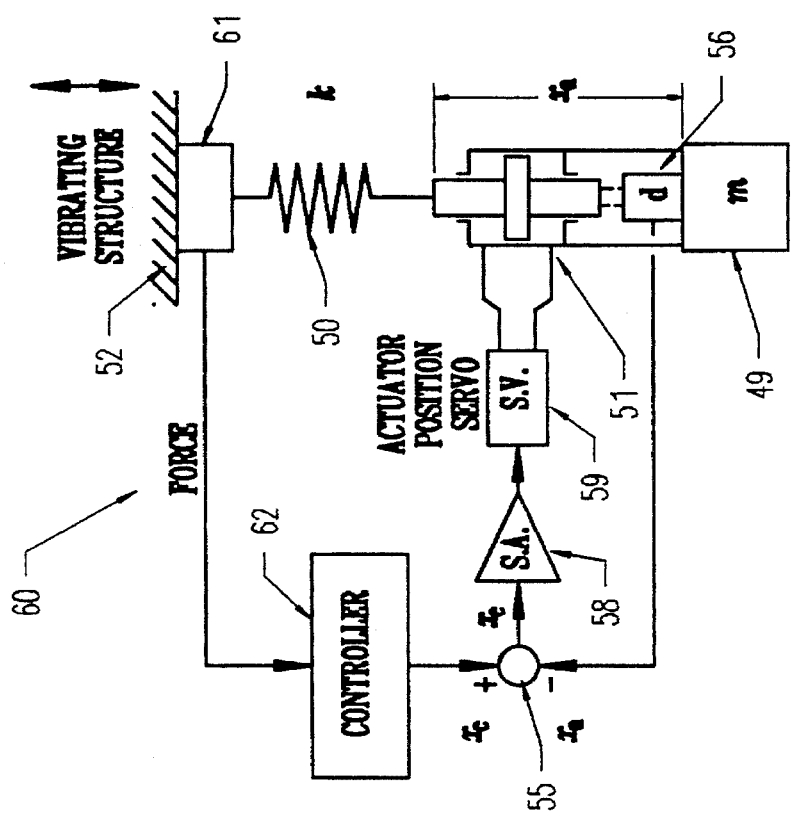
FIG. 7 is a hybrid schematic-block diagram of a variant form of actively-controlled mass-spring system having a high-impedance actuator and operatively arranged to vary the effective mass of the mass-spring system.

FIG. 7 (High-Impedance Actuator With Variable Effective Mass)

FIG. 7 depicts an alternative system, generally indicated at 60, in which the actuator is arranged to vary the effective magnitude of the mass, rather than the effective stiffness of the spring. This second form uses many of the elements previously described, although they are differently arranged. Hence, the same reference numerals will be used to the extent possible. Accelerometer 53 has been omitted. System 60 has mass 49, actuator 51 and spring 50 connected mechanically in series to a vibrating structure 52 through a force-sensing load cell 61. In this arrangement, however, actuator 51 is arranged between the spring and mass. Load cell 61 supplies a force signal to controller 62, which in turn supplies an actuator rod position command signal ($x_c$) to summing point 55. LVDT 56 senses the actual position ($x_a$) of the actuator rod relative to the mass, and supplies it as a negative feedback signal to summing point 55. The summing point algebraically sums the command and feedback signals, and supplies a position error signal ($x_e$) to servo-amplifier 58, which in turn supplies an appropriate current ($i_v$) to servovalve 59 for operating the actuator.

In this arrangement, the actuator may be selectively operated to cause the incremental motion of the mass to be in-phase or out-of-phase with respect to, and greater or less than, the incremental spring motion. This has the effect of varying the effective magnitude of the mass, and produces a corresponding variation in the natural frequency of mass-spring system 60.

It should be noted that in the arrangements shown in FIGS. 6 and 7, the mass, spring and actuator are mechanically connected in series with the vibrating structure so that the force developed in each element is necessarily the same as in the other two. Hence, the distinction between using actuator modulation to vary the apparent or effective spring rate (i.e., FIG. 6), or the apparent or effective magnitude of the mass (i.e., FIG. 4), is really semantic. In either case, actuator modulation is controlled by a closed-loop servo-control system that compares actual rod displacement with a commanded rod displacement derived from the mass acceleration force. In the first form, the command signal ($x_c$) is derived from an acceleration of the mass. In the second form, it is derived from the force transmitted from spring 50 to the structure.

The actuator disclosed in FIGS. 6 and 7 has a high mechanical output impedance in that it produces a commanded position of its rod, and will react to whatever force is developed by the system response to that displacement. In other words, the actuator has a high internal stiffness. However, other systems may employ actuators having low mechanical impedance.

Figure 8:
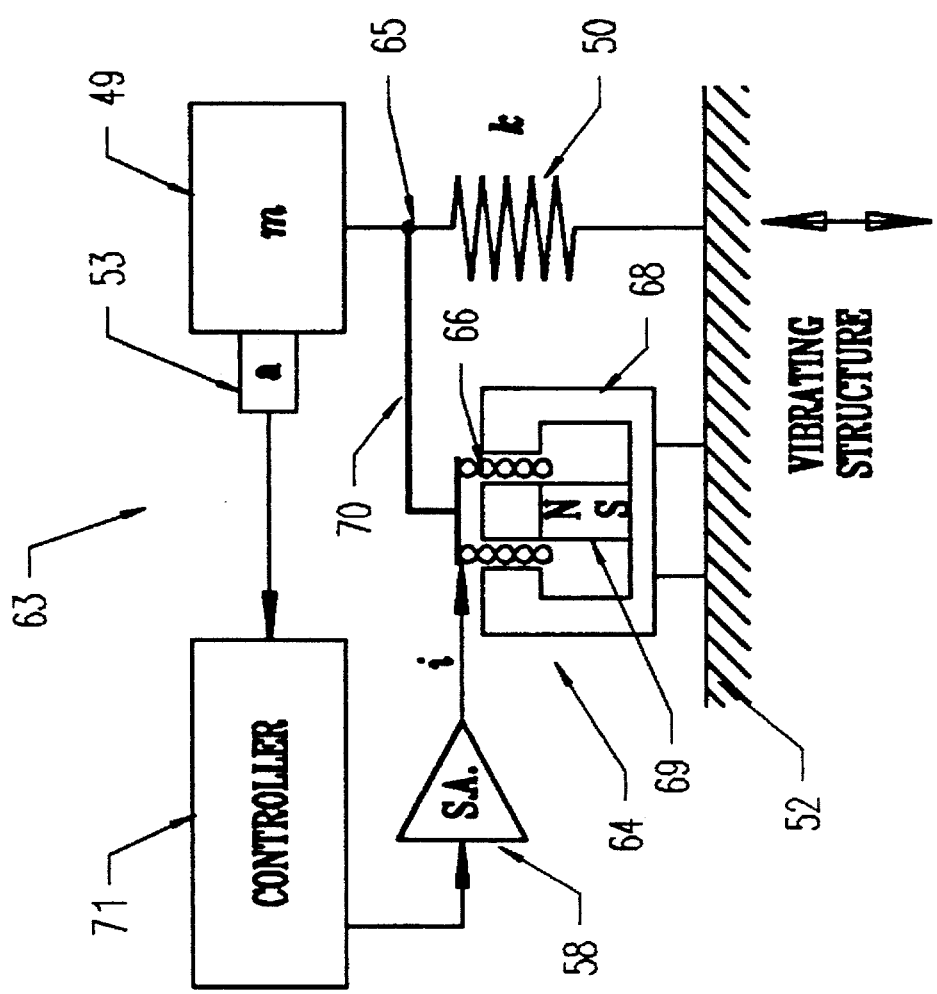
FIG. 8 is a hybrid schematic-block diagram of a variant form of actively-controlled mass-spring system, this view showing a low-impedance electromagnetic actuator as being arranged in parallel with the spring.

FIG. 8 (Low-Impedance Electro-Magnetic Actuator)

FIG. 8 is a hybrid schematic-block diagram of a mass-spring system, generally indicated at 63. This system has a mass 49 and a spring 50 arranged mechanically in series with a vibrating structure 52. However, in this form, actuator 51 has been omitted. Rather, an electro-mechanical actuator, generally indicated at 64, is operatively arranged to act between the structure and a node 65 between the mass and spring. Actuator 64 has a low mechanical impedance, as compared to that of actuator 51 in FIGS. 6 and 7, which is to say that it produces a commanded force essentially independent of position. This actuator has a coil 66 arranged to move vertically in a magnetic field between the inner and outer concentric legs of a body 68. The magnetic field is supplied by a permanent magnet 69. The position of the coil is coupled to node 65 through a rigid L-shaped arm 70. An accelerometer 53 is arranged to sense the spatial vertical acceleration of mass 49, and supplies a signal to controller 71. This controller provides an appropriate signal to servo-amplifier 58, which in turn supplies an appropriate current i to coil 66. Thus, the force produced by actuator 64 is summed with the reaction force at node 65. This actuator-produced force may be selectively modulated so as to be in-phase or out-of-phase with respect to the mass motion so as to controllably vary the apparent mass or the effective spring rate, depending on one's point-of-view, thus producing a concomitant change in the resonant frequency of the mass-spring system.

FIGS. 9–12 (Intermediate-Impedance Electro-Magnetic Actuator)

Figure 9:
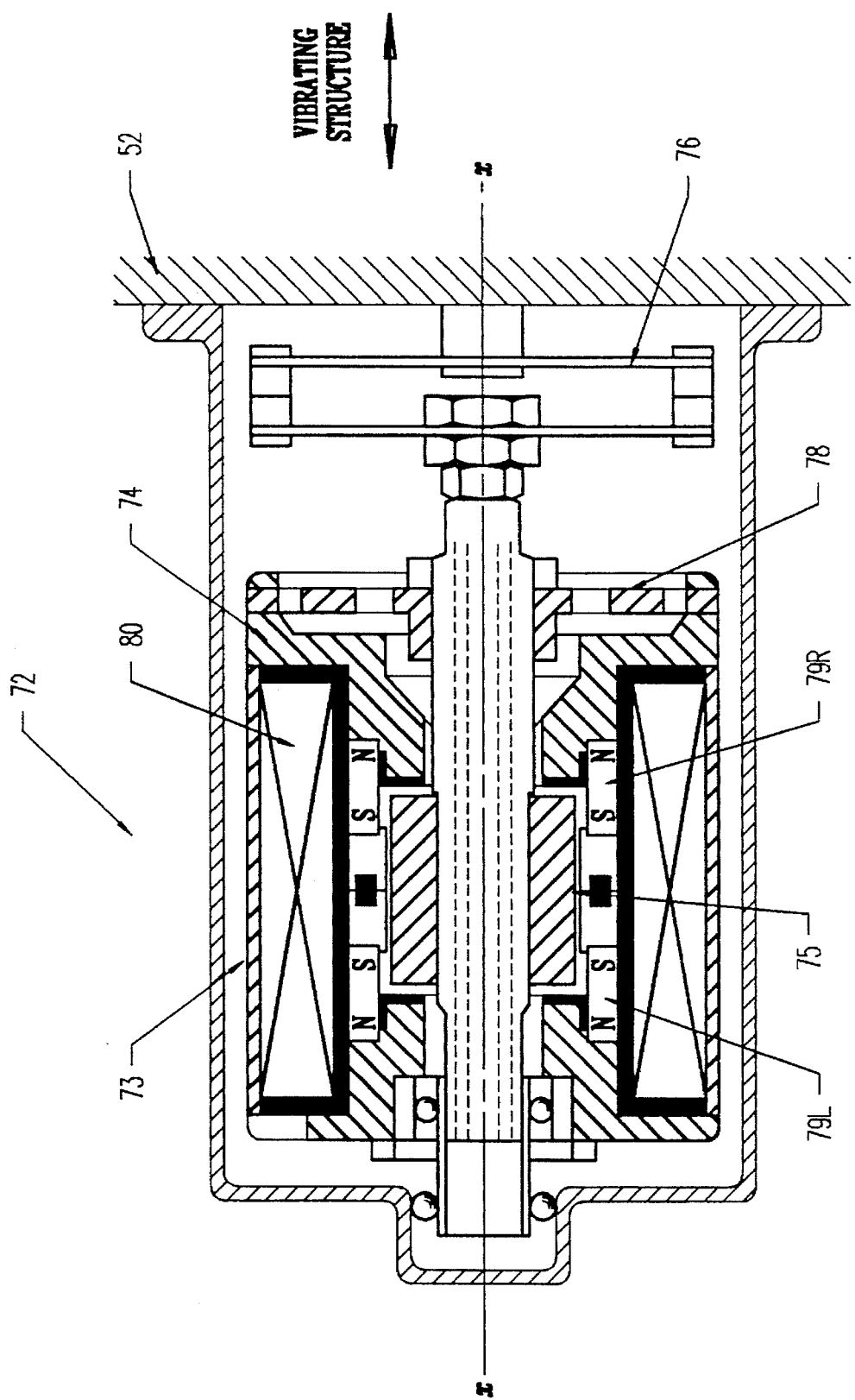
FIG. 9 is a fragmentary vertical sectional view of a variant form of actively-controlled mass-spring system, this form having a variable air gap, electromagnetic linear force motor mounted on a vibrating structure through an intermediate flexure spring.

Similar reasoning can be applied to a controllable mass-spring system having a variable air gap, electromagnetic motor, such as shown in FIG. 9. This type of motor exhibits an intermediate level of mechanical impedance, or internal stiffness. While having limited strokes, such motors have the advantage of producing higher output force at less power input, and with less total weight than other types of linear motors In FIG. 9, mass-spring system 72 is shown as including an electromagnetic motor 73 having a body 74, which acts as the moving mass, and an armature 75 connected to a vibrating structure 52 through an intermediate flexure spring 76. The armature 75 is held centered with respect to body 74 by a flexure spring 78. The motor has two axially-spaced annular magnets 79L, 79R mounted on body 74 and operatively arranged to polarize the axial air gaps at the opposite ends of the armature. A coil 80 carried by the body may be selectively energized to controllably vary the net fluxes in the respective air gaps. Thus, the magnetic force exerted between the armature and the body varies as a function of the coil current.

Figure 10:
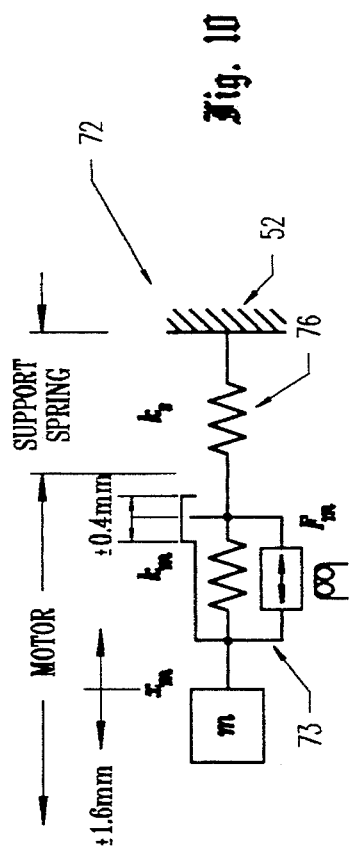
FIG. 10 is a functional schematic of the mass-spring system shown in FIG. 9.
Figure 11:
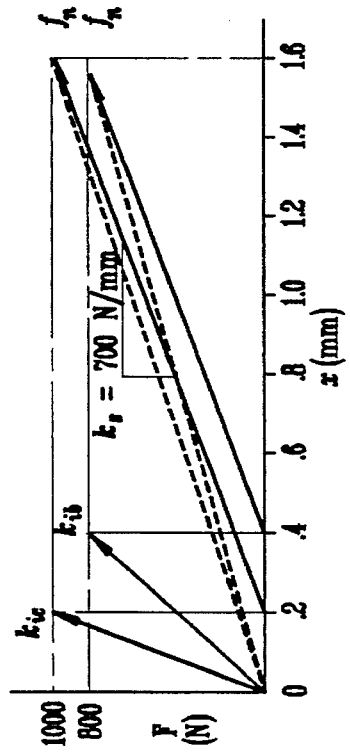
FIG. 11 is a plot of force (ordinate) vs. displacement (abscissa), showing the individual contributions of the mass-spring system shown in FIG. 9.
Figure 12:
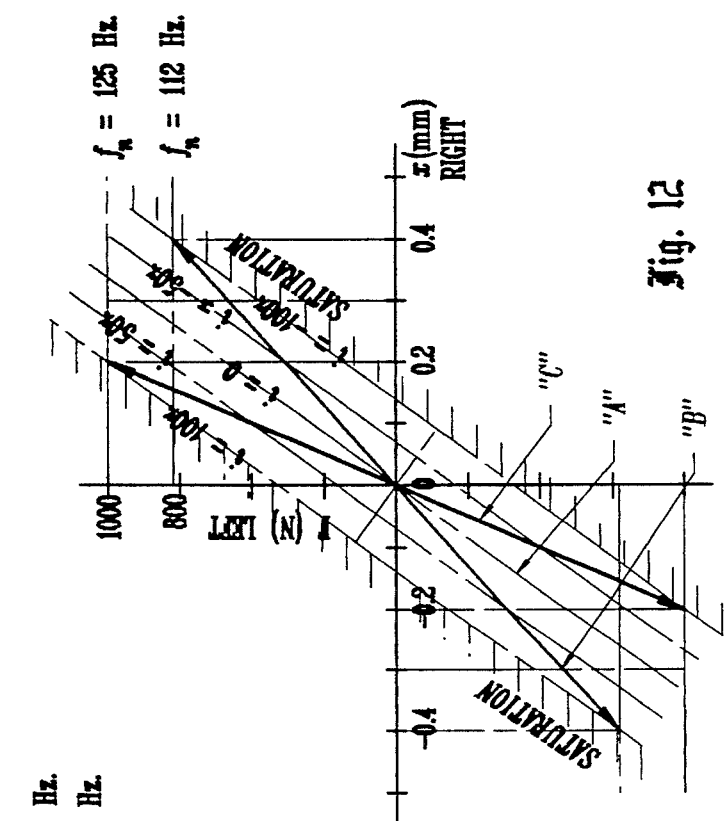
FIG. 12 is a plot of force (ordinate) vs. displacement (abscissa) showing the contribution of the force motor on a larger scale for various current levels.

FIG. 10 is a functional diagram of the structure shown in FIG. 9. In FIG. 10, the motor mass m is coupled to structure 52 through its effective impedance or internal stiffness ($k_m$), in parallel with a current-produced force $F_m$, and through the stiffness ($k_s$) of spring 76. In FIG. 12, the nominal internal stiffness of the motor is shown as having a value of 1000 N at x=0.3 mm (i.e., 3300 N/mm) at zero current (line "A"). This stiffness can be altered by suitably modulating the motor current as a function of displacement to produce a reduced stiffness, $k_{ib}$=2000 N/mm (line "B"), or an increased stiffness, $k_{ic}$=5000 N/mm (line "C"). FIG. 11 shows graphically the variable motor stiffness ($k_i$) in series with the support spring stiffness, $k_s$=700 N/mm. The combined spring stiffness can thus be adjusted so that, with a moving motor mass of 1.1 kg, the natural frequency can be actively "tuned" between 112 Hz and 125 Hz, a variation of about ±5.5% from a median frequency of about 118.5 Hz.

This device, shown in FIGS. 9-12, is configured as a force generator (i.e., having an electromagnetic motor, similar to that shown in the system illustrated in FIG. 8) in parallel with one spring (in this case, inherent in the motor), and that combination is arranged in series between a second spring and a mass (inherent in the motor structure). It thus constitutes an illustration of the flexibility of configuration in which the invention may be implemented to allow a practical design to take advantage of a particular type of servoactuator.

Application Of The Invention

In order to appreciate the effectiveness of the invention and the associated method of control, it will be effective to describe a practical application in some detail. FIG. 13 illustrates a schematic diagram of the primary structure of a helicopter, generally indicated at 81. Vibratory forces generated by the rotor 82 are transmitted to the fuselage structure 83 through the transmission 84 and its attach points 85 to the major lift frames 86 and 88, respectively. Fore and aft and lateral forces at the rotor hub will primarily excite the longitudinal bending and torsional vibratory modes of the structure, and thus cause a magnified vibration of the cockpit 89 at the forward end of the fuselage. Counter-vibration forces applied vertically to either side of the forward lift frame 86 can be effective in reducing the vibration felt in the cockpit. Thus, it is desirable to attach left and right vibratory force generators 90L, 90R, respectively, at the outboard ends of the forward lift beam 86, and to control their force outputs by means of accelerometers 91L, 91R, respectively, mounted at either side of the cockpit floor.

To minimize the weight to be added to the aircraft, it is desirable that the force generator reaction mass be as small as possible, consistent with the large vibratory forces typically required. Hence, it is sensible to make the mass a part of a resonant mass-spring system, as taught in the prior art. Implementation of the presently-disclosed invention will permit such a mechanism to generate sinusoidal forces in response to electrical command inputs over the frequency band of typical rotor speed variations, independent of the vibration present in the structure at the mounting points. Further weight-saving may be realized by taking advantage of the design flexibility afforded by the inventive method to utilize the inherent mass of the landing gear, which may be fortuitously mounted on either side of the forward lift frame. FIG. 14 illustrates a typical mounting arrangement in which the landing gear wheel 92 is carried on a radius arm 93 pivoted aft on the bottom of the fuselage. The oleo strut 94, which carries the weight of the aircraft in landing, is mounted on the ends of the transverse lift beam 95.

This installation may be readily converted to an active resonant inertial force generator, generally indicated at 96 in the simplified mechanical diagram of FIG. 15. Here, the primary reaction bearing 98 is carried in an elongated slot 99 at the upper end of the oleo strut 94. A suitably-sized servoactuator 100 and series spring 101 are interposed between the end of the strut and the structure 102. In flight, the weight of the landing gear is carried by the servoactuator through the series spring so that the bearing 98 is midway in the slot 99. In order that motion of the actuator can excite the mass-spring system, the stiffness of spring 101 is chosen to cause the natural frequency to approximate the normal frequency of the rotor-induced vibrations. The peak vibratory forces required, while substantial, are much less than the weight of the aircraft so that, on landing, the series spring is compressed to allow bearing 98 to bottom in slot 99. Thus, all the landing reaction loads bypass the spring and servo-actuator and are carried directly into the original mounting point on the end of the lifting beam.

Some helicopter configurations utilize so-called "tricycle" landing gear, which consists of a single wheel under the nose and a pair of main gear wheels mounted well aft on the fuselage, where they cannot effectively function as part of a suitably-located inertial force generator. In such a case, an alternative approach to providing a resonant mass-spring system at the desired location on the ends of the forward lift beam could be implemented as shown in FIG. 16. This arrangement illustrates additional function elements which may be incorporated into various form of the invention. The moving mass 103 is shown as being carried on the end of a flexing lever 104, which is attached at its midpoint to a servoactuator 105, both of which are supported on the main lift frame 106. The inertia reflected to the actuator, and, in turn, to the structure, is effectively magnified by the square of the lever ratio, b/a, so that the stroke of the actuator can be reduced. Designing the lever between the mass and the actuator to flex allows it to function as at least a part of the spring sized to resonate with the moving mass. The compliance of the fluid contained in the hydraulic actuator cylinder will also contribute to the total spring acting between the mass and the structure. While the exact coefficient of such a fluid spring may vary somewhat, it is practical to utilize it in combination with the present invention since the exact resonant frequency need not be precisely matched to the disturbing rotor frequency, as would have been the case with a purely-passive resonant absorber.

Either form of the active resonant inertial force generators described above may be usefully operated by a controller receiving fuselage vibration information from a pair of accelerometers mounted on the left and right sides, respectively, of the cockpit floor. The controller can be programmed to apply command signals to each of the active force generators to produce vibratory inputs to the structure so as to reduce the net vibration of the cockpit floor. To reduce longitudinal vibrations, the signals from both cockpit accelerometers are summed, and the resulting command signal from the controller is input to both the left and right active force generators. To reduce torsional vibrations at the cockpit, the signal from one accelerometer is subtracted from the signal produced by the other, and the resulting difference command signal is added to the summed command input to the force generator on one side of the forward lift beam are subtracted from the other. This is a simple and practical means of controlling two sources of counter-vibration to reduce the disturbance vibration at two points in the structure, and is possible because the vibratory modes are usually not well coupled and the counter-vibration input locations are appropriately chosen to excite each mode separately.

While several presently-preferred forms of the improved active resonant inertial force generator have been shown and described, and several modifications and changes thereof discussed, persons skilled in this art will readily appreciate that various additional changes and modifications may be made without departing from the spirit of the invention, as defined and differentiated by the following claims.

What is claimed is:

1. A vibratory inertial force generator including an actively-controlled mass-spring system arranged to be resonantly excited so as to exert a vibratory reaction force on a structure, said system having a mass mounted for movement relative to said structure and having a spring arranged between said mass and structure, wherein the improvement comprises:

an externally-powered servoactuator mounted on one of said mass and structure and arranged to modulate said vibratory reaction force transmitted from said mass to said structure as a function of the acceleration of said mass so as to controllably modify the resonant frequency of said system.

2. A vibratory inertial force generator as set forth in claim 1 wherein said servoactuator is connected mechanically in series with said mass and said spring.

3. A vibratory inertial force generator as set forth in claim 2 wherein said servoactuator is arranged between said structure and said spring.

4. A vibratory inertial force generator as set forth in claim 1 wherein said servoactuator is hydraulically powered.

5. A vibratory inertial force generator as set forth in claim 1 wherein said spring is formed by the compliance of a fluid contained in a piston-cylinder assembly.

6. A vibratory inertial force generator as set forth in claim 1, and further comprising:
   command means for generating an oscillatory force command signal;
   transducer means arranged to generate a feedback signal proportional to the acceleration of said mass;
   means for producing an error signal proportional to the difference between said command signal and said feedback signal; and
   control means for modulating said servoactuator as a function of said error signal to cause said system resonant frequency to equal that of the oscillatory force command signal, and to further excite the mass-spring system at its modified resonant frequency so that the reaction force exerted on said structure will be essentially equal to the commanded oscillatory force.

7. A vibratory inertial force generator as set forth in claim 6 wherein said structure is a helicopter having a rotor, and wherein the frequency of said oscillatory force command signal is a function of the rotational speed of said rotor.

8. A vibratory inertial force generator as set forth in claim 6 wherein said force command signal is a function of the vibratory velocity of at least one point in said structure affected by the force transmitted from said mass.

9. A vibratory inertial force generator as set forth in claim 8 wherein the vibrations at said one point are substantially cancelled.

10. A vibratory inertial force generator as set forth in claim 6 wherein said control means is arranged to cause said actuator to produce a velocity as a function of said error signal such that said mass-spring system will not be substantially resonantly excited by vibrations of said structure near the resonant frequency.

11. A vibratory inertial force generator as set forth in claim 10 wherein the gain of the closed loop so formed is selected so that the resonance of said mass and each spring of said system has an effective damping ratio greater than about 0.5.

12. A vibratory inertial force generator as set forth in claim 6 wherein said transducer means includes an accelerometer mounted on said mass for sensing the spatial acceleration of said mass.

13. A vibratory inertial force generator as set forth in claim 1 wherein said system is configured as an active resonant absorber mounted on a vibrating structure, and further comprising:
   transducer means operatively arranged to sense the acceleration of said mass; and
   control means responsive to the output signal from said transducer means and operatively arranged to modulate said servoactuator so as to continuously modify the resonant frequency of said mass-spring system to equal the frequency of the vibrating structure;
   whereby the mass-spring system will be resonantly excited by the structural vibration and the resulting reaction force on said structure, acting to damp said structural vibration, will be maximized.

14. A vibratory inertial force generator as set forth in claim 13 wherein said control mass will cause the servoactuator displacement to be proportional to said sinusoidal acceleration of said mass minus a frequency-squared correction function;
   whereby the servoactuator modulation amplitude is zero when the structural vibration frequency is equal to the unmodified resonant frequency, and is continuously adjusted as a function of the incremental change of the structural vibration frequency from the unmodified system resonant frequency.

15. The method of controlling an active resonant inertial force generator having a movable mass coupled through at least one spring to a structure, comprising the steps of:
   mounting an externally-powered servoactuator on one of said mass and structure so as to be capable of modulating the vibratory reaction force transmitted between said mass and structure;
   commanding a desired vibratory force, at a desired frequency, to be exerted on said structure by said generator;
   modulating said servoactuator so as to excite the mass-spring system and to continuously adjust the natural frequency of the mass-spring system so as to generate a vibratory reaction force acting on said structure at said commanded frequency;
   measuring said vibratory reaction force; and
   controlling the modulation of said servoactuator to minimize the difference between said commanded force and said measured vibratory reaction force.

16. The method as set forth in claim 15 wherein said vibratory force is measured as a function of the acceleration of said mass.

17. The method as set forth in claim 16 wherein the steps previously set forth form an acceleration feedback servo-loop, and wherein the gain of said servoloop is adjusted so that the effective damping ratio of the resonant mass-spring system, when excited by structural vibrations, is at least 0.5.

18. In an actively-controlled mass-spring system having a resonantly-vibrating mass adapted to exert a vibratory reaction force on a vibrating structure at a mounting point in response to an electrical command signal, the improvement which comprises:
   an externally-powered servoactuator operatively arranged to act on one of said mass and structure;
   means for providing an electrical command signal reflecting a desired force; and
   control means responsive to said command signal for modulating said servoactuator so as to cause the resonant frequency of said system to continuously approximate the frequency of said command signal and to resonantly excite the mass-spring system such that the reaction force exerted on said structure is substantially equal to the electrically-commanded force.

19. The improvement as set forth in claim 18 wherein said servoactuator is controlled as a function of the vibratory acceleration of said mass.

20. The improvement as set forth in claim 18 wherein said system includes a mass acceleration feedback control loop closed around said servoactuator and said control means, and wherein the gain of said feedback loop is adjusted such that the response of the mass-spring system to structural vibrations exhibits a damping ratio greater than about 0.5.

21. A vibratory inertial force generator including an actively-controlled mass-spring system arranged to be resonantly excited so as to exert a vibratory reaction force on a structure, said system having a mass mounted for movement relative to said structure and having a spring arranged between said mass and structure, wherein the improvement comprises:

an externally-powered servoactuator mounted on one of said mass and structure and arranged to modulate said vibratory reaction force transmitted from said mass to said structure as a function of the acceleration of said mass so as to controllably modify the resonant frequency of said system;

command means for generating an oscillatory force command signal;

transducer means arranged to generate a feedback signal proportional to the force transmitted from said mass to said structure; and means for producing an error signal proportional to the difference between said command signal and said feedback signal.

22. A vibratory inertial force generator including an actively-controlled mass-spring system arranged to be resonantly excited so as to exert a vibratory reaction force on a structure, said system having a mass mounted for movement relative to said structure and having a spring arranged between said mass and structure, wherein the improvement comprises:

an externally-powered servoactuator mounted on one of said mass and structure and arranged to modulate said vibratory reaction force transmitted from said mass to said structure as a function of the acceleration of said mass so as to controllably modify the resonant frequency of said system;

command means for generating an oscillatory force command signal;

transducer means arranged to generate a feedback signal proportional to the acceleration of said mass;

means for producing an error signal proportional to the difference between said command signal and said feedback signal; and control means for modulating said servoactuator as a function of said error signal to cause said system resonant frequency to equal that of the oscillatory force command signal, and to further excite the mass-spring system at its modified resonant frequency so that the reaction force exerted on said structure will be essentially equal to the commanded oscillory force.

* * * * *